United States Patent [19]
Warmoth et al.

[11] Patent Number: 6,098,597
[45] Date of Patent: Aug. 8, 2000

[54] HYDRAULIC SYSTEM WITH A COMBINATION FILTER SCREEN AND GASKET

[75] Inventors: Thomas B. Warmoth, Downers Grove; Manuel Gamboa, Franklin Park; Edgardo Y. Estacio, Itaska; David B. Meisner, Carol Stream, all of Ill.

[73] Assignee: Navistar International Transportation Corp, Chicago, Ill.

[21] Appl. No.: 09/391,172

[22] Filed: Sep. 7, 1999

Related U.S. Application Data

[60] Provisional application No. 60/129,976, Apr. 19, 1999.

[51] Int. Cl.[7] .................................................. F02M 33/04
[52] U.S. Cl. ............................................................ 123/447
[58] Field of Search .................................. 123/446, 447, 123/467

[56] References Cited

U.S. PATENT DOCUMENTS 5,213,083  5/1993  Glassey .
5,245,970  9/1993  Iwaszkiewicz .
5,839,413  11/1998  Krause et al. ............................ 123/447

*Primary Examiner*—Thomas N. Moulis
*Attorney, Agent, or Firm*—Dennis Kelly Sullivan; Jeffrey P. Calfa

[57] ABSTRACT

The present invention describes a filter gasket (50) for removing debris from the hydraulic fluid in an internal combustion engine (10). An upper reservoir structure (30) is mounted on a front cover (14) of the engine (10) at interface (46). The front cover forms a lower reservoir (16). The upper reservoir structure (30) forms an upper reservoir (35). A gasket (42) is disposed along the interface (46) to seal the upper reservoir structure (30) to the front cover (14). A screen assembly (70) is positioned adjacent to the interface (46). The screen assembly (70) includes a filter screen (76) connected to a plate member (56). The plate member (56) operatively engages the gasket (42). The plate member (56) forces hydraulic fluid to pass through the filter screen (76), thus retaining debris that exceed the mesh size of the filter screen (76).

28 Claims, 6 Drawing Sheets

SECTION B-B

HYDRAULIC SYSTEM WITH A COMBINATION FILTER SCREEN AND GASKET

CROSS-REFERENCE TO RELATED APPLICATIONS

This application is related to Provisional Application No. 60/129,976 having a filing date of Apr. 19, 1999.

FIELD OF THE INVENTION

This invention relates generally to hydraulic systems for internal combustion engines. More particularly, this invention relates to hydraulic stems having a combination filter screen and gasket to remove debris from the hydraulic fluid in a fuel injection system with a high-pressure pump and a priming reservoir.

BACKGROUND OF THE INVENTION

In engine manufacturing, metal chips and other debris may remain in the engine even when engine parts are cleaned prior to assembly. By their nature, fittings with tapered thread connections create metal chips when assembled into a threaded hole. Machining also may leave metal chips. Casting processes may leave other debris in core passages and crevices. As a result, engines inevitably have some debris inside deep-drilled holes, cast-in core passages, and other places. During engine operation, the heating and cooling of the engine releases this debris into the hydraulic fluid. As the hydraulic fluid flows, the metal chips and other debris move throughout the hydraulic system.

The metal chips and other debris may interfere with proper operation of the engine. This interference is more problematic for engines with hydraulically actuated fuel injection systems. In these engines, a priming reservoir typically is disposed at a level higher than the inlet to the high-pressure pump. The priming reservoir includes a lower reservoir portion usually cast into the engine front cover. An upper reservoir portion is attached to the lower reservoir portion to increase the reservoir volume. A gasket seals the lower and upper reservoir portions. The priming reservoir provides gravity feed to the pump during engine start-up. Any debris in the hydraulic fluid tends to accumulate in the priming reservoir. On engine start-up, the pump drives accumulated debris throughout the hydraulic system. While the engine is running the pump continues to drive debris through the hydraulic system.

Debris in the hydraulic fluid may obstruct sensors, valves, and other parts of the hydraulic system and, especially, the hydraulic-actuating portion of the fuel injector system. Metal chips may clog injector pressure regulators, high-pressure pumps, injectors, and pressure control valves because these parts typically are manufactured to very close tolerances. Even though some parts (e.g., the pressure control valve) have internal filters (e.g., an edge filter), too much debris may clog and prevent proper function of these filters.

Accordingly, there is a need for a filter screen to remove debris from the hydraulic fluid of an internal combustion engine, especially those with hydraulically actuated fuel injection.

SUMMARY OF THE INVENTION

The present invention provides a hydraulic system with a combined filter screen and gasket—a filter gasket—for removing debris from hydraulic fluid in an internal combustion engine. The filter gasket also seals the upper and lower reservoirs to form a priming reservoir for the hydraulic system. In the engine, an upper reservoir structure is mounted on a front cover at an interface. The front cover forms the lower reservoir and has a top edge with a depression. The upper reservoir structure forms the upper reservoir and has a bottom edge. The top and bottom edges form the interface.

The filter gasket is located at the interface and has a gasket and a screen assembly. The gasket is located along the interface inside the depression for sealing the upper reservoir structure to the front cover. The depression's depth and the gasket's thickness control the "squeeze" on the gasket.

The screen assembly has a plate member located at the interface for connecting with the gasket. The plate member forms an aperture having a cross-section area. A filter screen is connected to the plate member for enclosing the aperture.

In one embodiment, the plate member is integrally connected to the gasket. The plate member has bonding holes along its periphery. When the gasket is formed on the plate member, the gasket material fills the bonding holes to mechanically connect the gasket to the plate member. The edges of the plate member may be treated with a bonding agent to chemically bond the gasket to the plate member.

In another embodiment, the plate member is not integrally connected to the gasket. The loose gasket is placed in the depression at the top edge of the front cover. The plate member is positioned inside the gasket and between the upper reservoir structure and the front cover. The plate member is thinner than the depth of the depression, but extends to contact the gasket along its periphery. Once assembled, the gasket deforms to create a face seal between the upper reservoir structure and the front cover. The gasket also seals around the edges of the plate member.

In either embodiment, the plate member separates the upper and lower reservoirs, forcing the hydraulic fluid to pass through the filter screen. The filter screen retains any debris in the hydraulic fluid larger than the filter screen's mesh size.

The filter screen has an open area large enough to provide the desired pressure drop for operation of the pump. Consequently, the filter screen may have a surface area larger than the cross-section area of the aperture. If so, the filter screen has an open end and a closed end. As shown, the filter screen has a cylindrical shape. However, it may have other shapes including conic, rectangular, or flat. In addition, the filter screen has a mesh size to retain particles large enough to cause damage to the hydraulic system or other parts. The screen assembly may have a flange for connecting the filter screen to the plate member. A flange would facilitate producing a solid weld for joining the filter screen to the plate member.

In another embodiment, the plate member may have a basket assembly. The basket assembly mechanically supports and may be connected to the filter screen. The basket assembly, the plate member, and the filter screen may be a single part. While the screen assembly may be made from other materials and combinations of materials, the basket assembly is preferred when the screen assembly is made of plastic.

The following drawings and description set forth additional advantages and benefits of the invention. More advantages and benefits are obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE INVENTION

Figure 1:
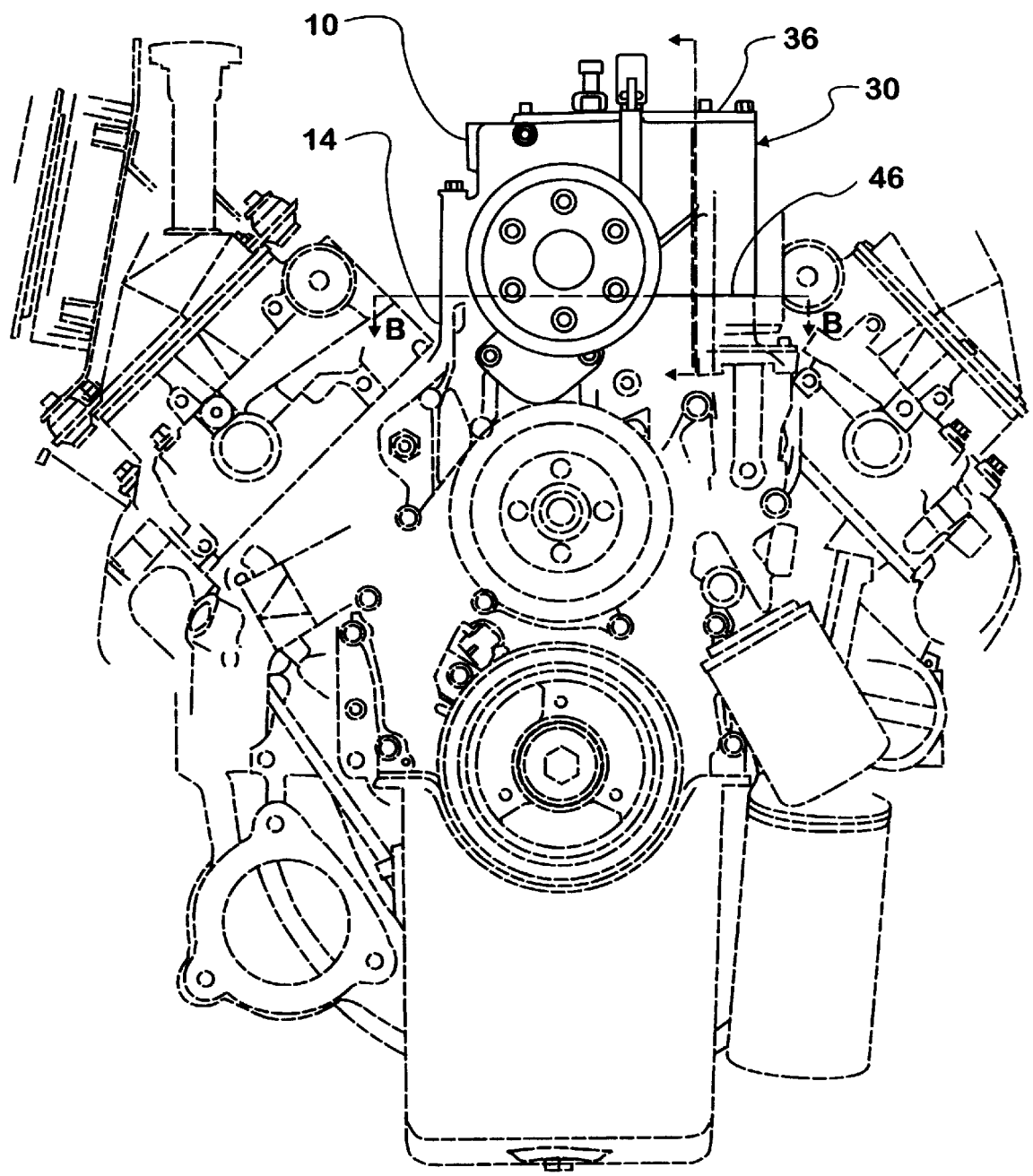
FIG. 1 is a front perspective view of an engine with a filter screen and gasket according to the present invention.
Figure 3:
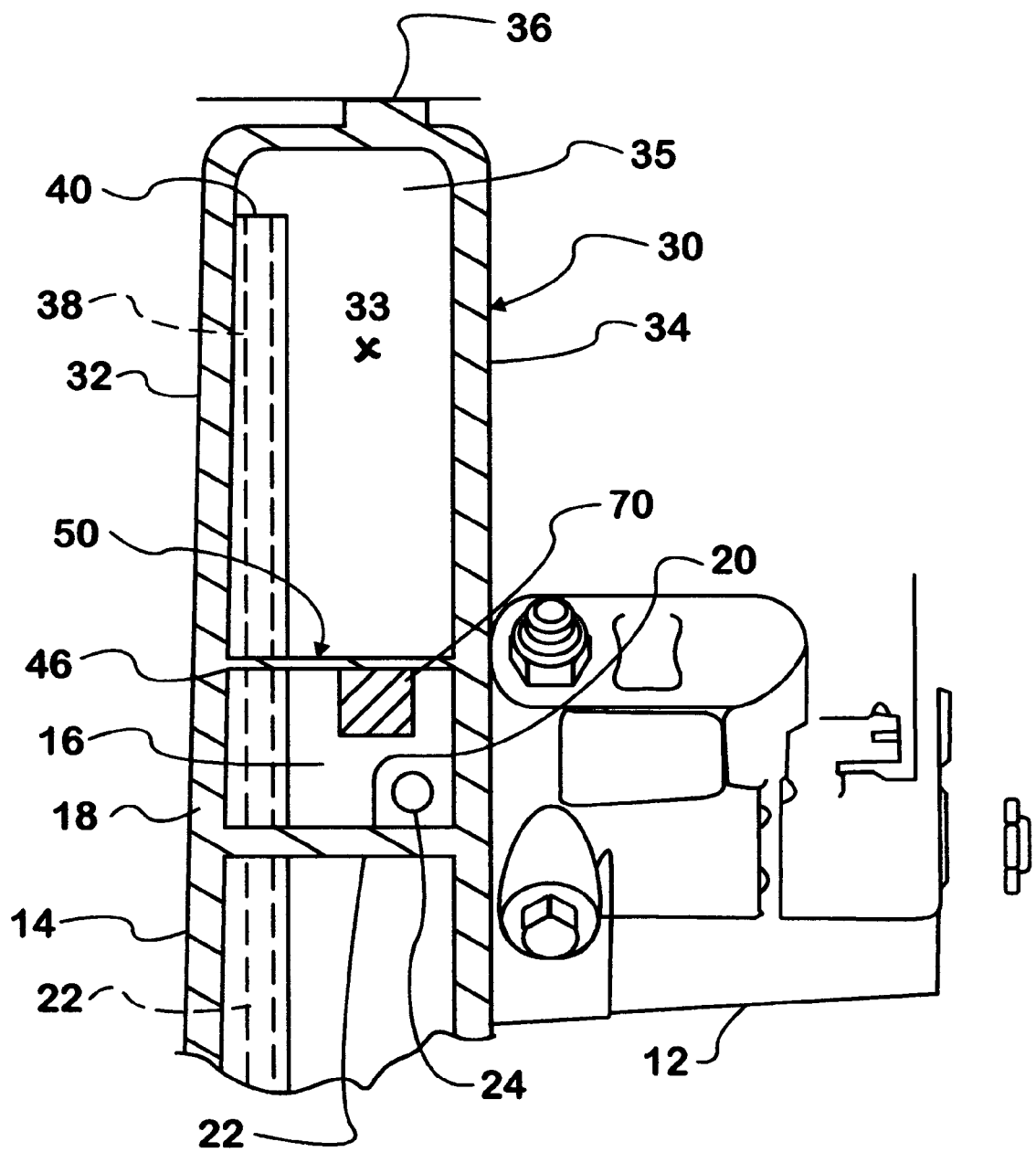
FIG. 3 is a side view a filter screen and gasket disposed in a priming reservoir according to the present invention.

FIG. 1 shows an internal combustion engine 10 having a V-configuration. The engine 10 has a hydraulically actuated electronically controlled unit injection (HEUI) fuel system including a priming reservoir. The engine 10 has an upper reservoir structure 30 mounted on a front cover 14 at an interface 46. As seen in FIG. 3, a high-pressure hydraulic pump 12 is mounted to the rear side of the engine front cover 14. The high-pressure hydraulic pump 12 supplies hydraulic-actuating fluid, preferably lubricating oil, to the fuel injectors. The hydraulic pump is driven by a gear train (not shown) located within the front cover 14.

Figure 2:
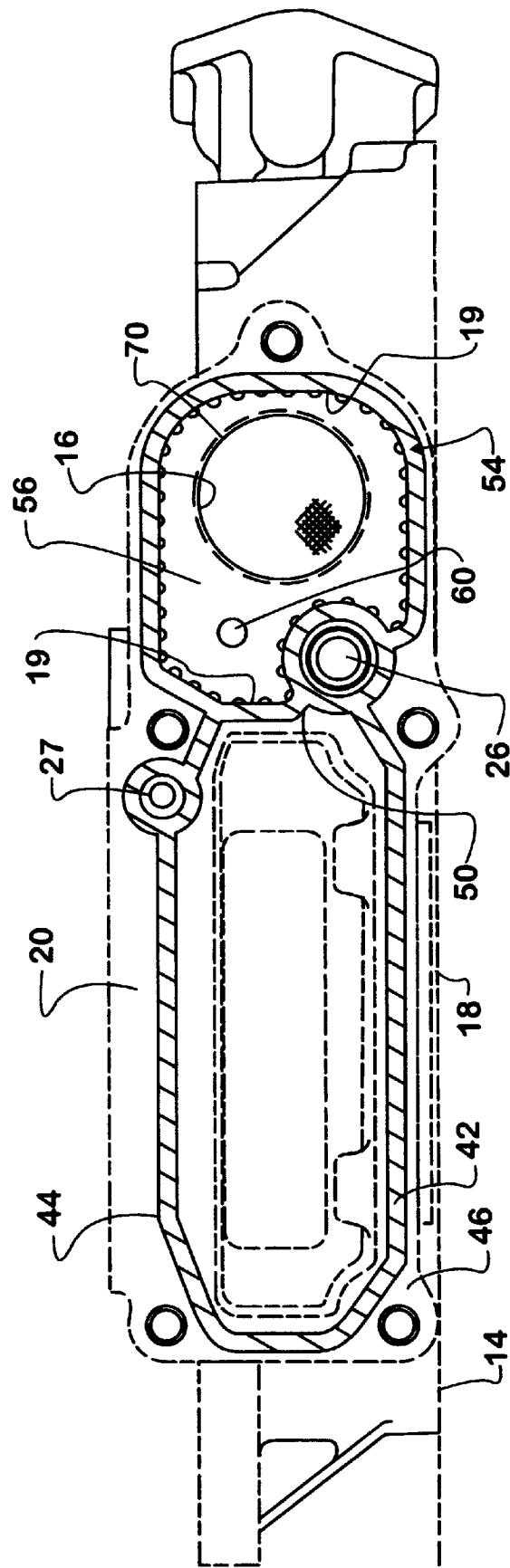
FIG. 2 is a top view a gasket and screen assembly disposed on a front cover according to the present invention.

In FIGS. 2 and 3, the front cover or lower portion 14 forms a lower reservoir 16 defined by a lower front wall 18, lower side walls 19, a lower rear wall 20, and a bottom wall 22. Preferably, the front cover 14 is made of cast iron. However, other suitable materials and forming methods may be used. The front cover 14 has a top edge forming a lower opening at interface 46. The top edge has a depression 44.

A lower reservoir supply passage 26 is cast as part of the front cover 14. The lower reservoir supply passage 26 is even with the top edge of the front cover 14. The depression 44 surrounds the lower reservoir supply passage 26 along the top edge. The lower reservoir supply passage 26 connects to the engine lubricating oil pump (not shown). The engine-lubricating pump supplies lubricating oil to the reservoir and hydraulic pump 12.

The upper reservoir structure 30 is mounted on the front cover 14 at the interface 46. The upper reservoir structure 30 forms an upper reservoir 35 defined by upper front wall 32, upper sidewalls 33, an upper rear wall 34, and an access cover 36. The upper reservoir 35 is larger than the lower reservoir 16. Preferably, the upper reservoir structure 30 is made from cast iron. However, other materials and forming methods made be used. The upper reservoir structure 30 has a bottom edge forming an upper opening at interface 46.

An upper reservoir supply passage 28 is cast as part of the upper reservoir structure 30. The upper reservoir supply passage 28 is even with the bottom edge and terminates adjacent to the access cover 36. The upper reservoir supply passage has an outlet 40, which opens to the upper reservoir 35.

When the upper reservoir structure 30 is mounted on the front cover 14 at interface 46, the upper front wall 32 meets lower front wall 18. The upper sidewalls 33 meet the lower sidewalls 19. The upper rear wall 34 meets the lower rear wall 20. The upper reservoir supply passage 28 mates with the lower reservoir supply passage 26 to form one continuous reservoir supply passage. The upper opening meets the lower opening to form a priming reservoir along the inner periphery of the upper reservoir structure 30 and front cover 14. The priming reservoir permits fluid communication between the upper and lower reservoirs.

Adjacent to the bottom wall 22, a passage 24 intersects the reservoir portion 16. The passage 24 connects to a fluid supply inlet (not shown) of the hydraulic pump 12. In addition, an air bleed and overflow drain passage 27 extends between the upper reservoir structure 30 and the front cover 14 as partially shown FIG. 2. The depression 44 surrounds the air bleed and overflow drain passage 27 along the top edge.

Figure 4:
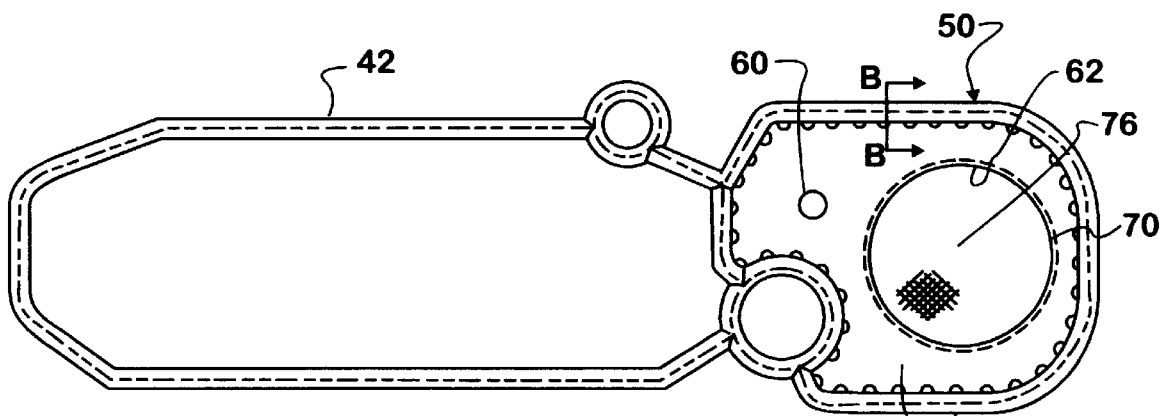
FIG. 4 is a top view of a gasket and screen assembly according to the present invention.

In FIGS. 2 and 3, a filter gasket 50 seals the interface 46 between the front cover 14 and the upper reservoir structure 30. The filter gasket 50 includes a gasket 42 and a screen assembly 70. The gasket 42 is preferably silicone rubber, but it may be made from another suitable sealant materials. The gasket 42 has an elongated circular cross section for disposing in the depression 44. The gasket 42 surrounds the entire periphery of the interface 46, the reservoir supply passage 26, 28, and the air bleed and overflow drain passage 27. As shown in FIG. 4, the gasket 42 has a reservoir gasket portion 54 surrounding the periphery of the reservoir.

Figure 5:
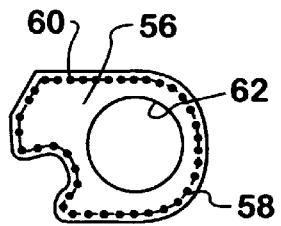
FIG. 5 is a top view of a screen assembly according to the present invention.
Figure 6:
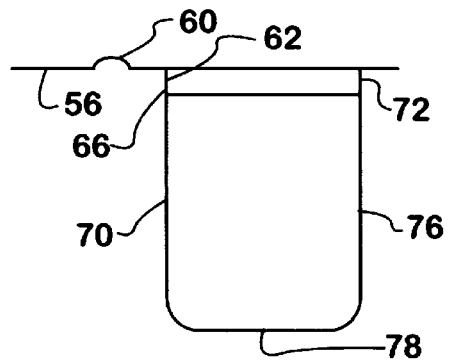
FIG. 6 is a side view of a screen assembly according to the present invention.
Figure 7:
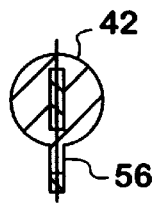
FIG. 7 is a cross-sectional view of the gasket at section B—B in FIG. 4 according to the present invention.

As seen in FIGS. 4–6, the screen assembly 70 has a filter screen 76 connected to a plate member 56. The filter screen 76 is cylindrical and has an open end 72 and a closed end 78. The cylindrical shape has a large surface area for trapping debris. Filter screen 76 may be another shape including conic, rectangular, and flat. When filter screen 76 is cylindrical, the open end 72 preferably faces the direction of the fluid flow. When filter screen 76 is conic, closed end 78 preferably faces the direction of the fluid flow. The orientation of the screen reduces the adverse effects of debris build-up on the screen. For example, if the open end of a cone-shaped filter screen faces the direction of the fluid flow, the build-up of debris at the tip of the cone blocks the mesh on both sides of the screen.

Filter screen 76 has a mesh size based on the particle size to be excluded. The finer the mesh size, the more debris retained by the filter screen 76. However, it is not necessary to retain all particles in the hydraulic fluid. Some particles are small enough to flow through the small orifices of the control valves and other engine parts without getting stuck. A screen with a 140 micron mesh size retains the larger, dangerous particles while permitting the smaller, inconsequential particles to pass.

In addition, the mesh size and the desired pressure drop across the screen determine the open area of filter screen 76. At temperatures near −20° F., a pressure drop of less than 5 psi is desired for proper operation of the high pressure pump 12. The desired pressure drop may require a screen with a large surface area, i.e. open area. Consequently, the filter screen 76 may need a cylindrical, conic, or some other non-flat shape in order to fit within the reservoir. The reservoir may be reconfigured so a flat screen with sufficient surface and open areas could be used to provide the desired pressure drop.

The plate member 56 has a solid, planar structure. It is configured to extend beyond the periphery of the reservoir and contact the reservoir gasket portion 54. The plate member 56 forms an aperture 62. While different shapes and dimensions may be used, aperture 62 has essentially the same shape and inside dimensions as the filter screen 76. A flange 66 may be used to connect the filter screen 76 to the plate member 56. If no flange is used, the filter screen 76 connects directly to the plate member 56. If a flange is used, the plate member 56 preferably forms the flange 66 along the peripheral edge of aperture 62. The flange 66 also may be a separate attachment to the plate member 56. Flange 66 enables a solid weld or other connection between the filter screen 76 and plate member 56. Accordingly, the plate member 56 forms a barrier between the lower reservoir 16 and the upper reservoir 35, forcing fluid communication through the filter screen 76.

Figure 8:
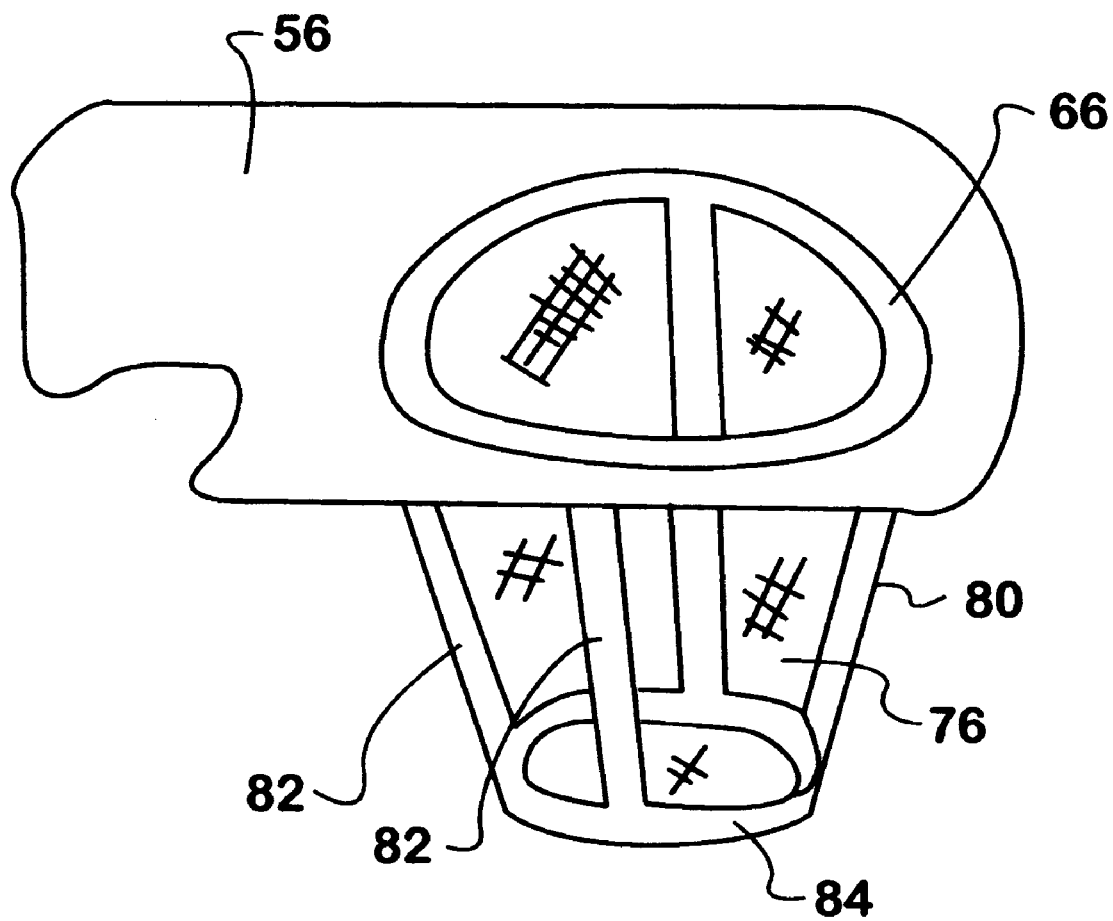
FIG. 8 is a perspective view of an alternate screen assembly according to the present invention.

Alternatively, the plate member 56 forms a basket assembly 80 for holding and supporting the filter screen 76 as shown in FIG. 8. The basket assembly 80 has support arms 82 and a support ring 84. The support arms 82 and the support ring 84 mechanically support the filter screen 76. The filter screen 76 may be attached to the basket assembly 80.

The plate member 56 and the filter screen 76 may be made from steel, aluminum, plastic, other materials, or a combination. In one embodiment, the plate member 56 is made from black-oxide coated, carbon steel plate. The filter screen 76 is made from stainless steel and is welded to the flange 66 formed on the plate member 56. If used, the basket assembly 80 is made from the black-oxide coated, carbon steel plate. The stainless steel screen may be welded to the basket assembly 80.

In another embodiment, the plate member 56 and the filter screen 76 are made of plastic. When plastic is used, it is preferable to have the basket assembly 80 as part of the plate member 56. The plastic screen may be integrally formed with the plate member 56 and basket assembly 80 when they are molded from the plastic. The plate member 56 and the basket assembly 80 may be a single part.

Preferably, the plate member 56 is integrally incorporated into the reservoir gasket portion 54 as shown in FIG. 4. As shown in FIG. 5, a plurality of bonding holes 58 are disposed adjacent to and along the periphery of plate member 56. When gasket 42 is made, plate member 56 is positioned inside an injection mold so the gasket material forms the reservoir gasket portion 54 along the periphery of plate member 56. Upon injection, the material used to make gasket 42, essentially fills the bonding holes 58. Once set, the material in the bonding holes 58 remains in contact with and is part of the gasket 42. As a result, the gasket 42 is mechanically bonded to the plate member 56. To assist the plastic forming process, the plate member has a locating bump 60 for positioning the plate member 56 in the injection mold. The edges of plate member 56 may be coated with a bonding agent to chemically bond the reservoir gasket portion 54 to the plate member 56.

Without the plate member 56, it is very difficult to attach gasket 42 directly to the filter screen 76. The gasket material bleeds through the screen openings upon injection into the mold. Other methods do not provide a suitable connection. A solid plate attached to both sides of the screen shuts-off the material flow. A leak path could develop between the plates and the screen when the screen is held in the mold by the edges. A hole or bump in the screen or the plate allows the gasket material to bleed through the plates and onto the screen.

In contrast, the plate member 56 avoids these problems. It enables the filter gasket 50 to be a single part having the filter screen 76 integrally-connected to the gasket 42. The plate member 56 also separates the upper and lower portions 16, 35. Consequently, it forces the hydraulic fluid to flow through the filter screen 76.

Figure 10:
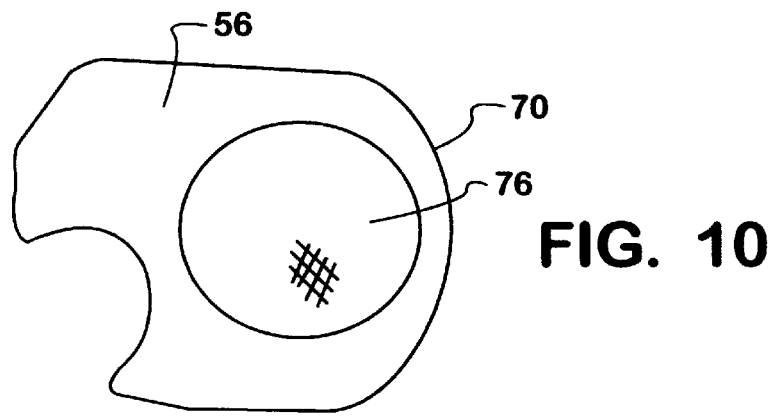
FIG. 10 is a top view of a screen assembly according to another embodiment of the present invention.
Figure 9:
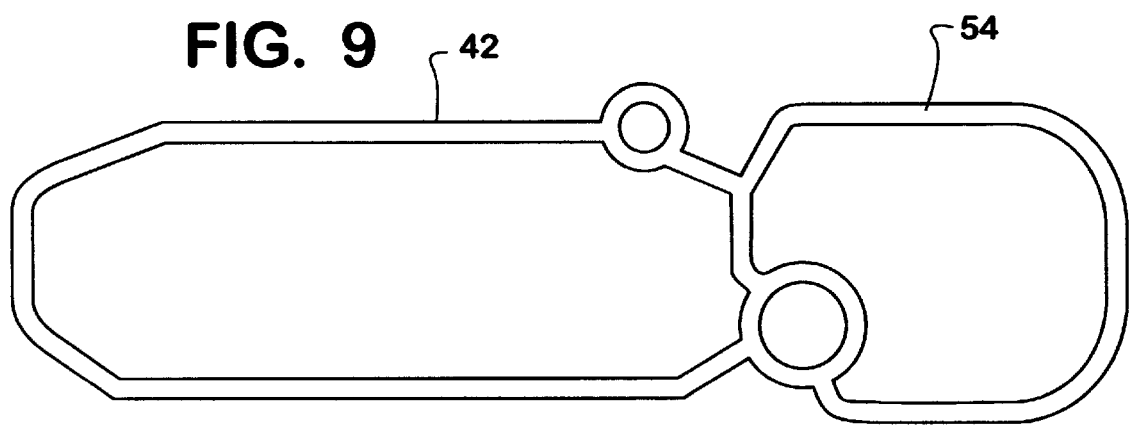
FIG. 9 is a top view of a gasket according to another embodiment of the present invention.

In an alternate embodiment, the plate member 56 is not integrally formed with the reservoir gasket portion 54 as shown in FIGS. 9–10. The screen assembly 70 and the gasket 42 are separate pieces. Consequently, there is no need for the bonding holes 58 and the locating bump 60 on the plate member 56. When the upper reservoir structure 30 is mounted on the front cover 14, the screen assembly is placed into the opening for the lower reservoir 16. The periphery of the plate member 56 extends beyond the periphery of the lower reservoir 16 and rests on the top edge of the front cover 14. The loose gasket 42 is positioned in the depression 44. The upper reservoir structure 30 is mounted on the front cover 14 sealing the gasket 42 against the plate member 56. The plate member 56 forms a barrier between the lower reservoir 16 and the upper reservoir 35, thus forcing fluid communication through the filter screen 76.

While the screen assembly 70 and the gasket 42 may be separate pieces, the filter gasket 50 provides a further advantage when the plate member 56 is integrally-attached to the reservoir gasket portion 54. The integrally-attached filter gasket makes it impossible to build the engine or system without the filter screen and pass a leak check test. If the filter screen 76 is omitted, there will be a noticeable leak from the missing gasket 42.

In these embodiments, the location of the filter gasket 50 takes advantage of the natural break between the upper reservoir structure 30 and the front cover 14. However, the filter gasket 50 could be applied in other locations. These locations include other natural breaks between parts forming the reservoir, other natural breaks between parts forming the hydraulic system, and even places where there are no natural breaks between the parts.

For example, the filter gasket may be placed between the top of the reservoir and its cover. In this case, the supply to the reservoir needs to enter through the cover. Alternately, the supply could enter an outlet located in the space between the filter gasket and the cover.

In addition, the filter gasket 50 may be positioned in places where there is not a natural break between the parts. In these locations, the filter gasket will need some means to hold it in position. The gasket 42 may not be necessary in these locations depending on the means used to hold the filter screen in place. However, the filter still must separate the reservoir or hydraulic section to force the hydraulic fluid through the screen.

While the invention has been described and illustrated, this description is by way of example only. Additional advantages will readily occur to those skilled in the art, who may make numerous changes without departing from the true spirit and scope of the invention.

Therefore, the invention is not limited to the specific details, representative devices, and illustrated examples in this description. Accordingly, the scope of the invention is to be limited only as necessitated by the accompanying claims.

What is claimed is:

1. A hydraulic system in an internal combustion engine, the hydraulic system comprising:

a lower portion;

an upper reservoir structure connected to the lower portion at an interface;

a gasket disposed along the interface for sealing the upper and lower portions; and a screen assembly positioned adjacent to the interface, the
    screen assembly including,
    a plate member operatively engaging the gasket, the
        plate member disposed for separating the upper and
        lower portions, the plate member forming an aperture with a cross-section area, and
    a filter screen connected to the plate member, the filter
        screen enclosing the cross-section area of the aperture.

2. A hydraulic system according to claim 1,
wherein the lower portion has a top edge forming a depression;
wherein the upper reservoir structure has a bottom edge;
wherein the top edge connects with the bottom edge when the upper reservoir structure is mounted on the lower portion; and
wherein the gasket is disposed in the depression.

3. A hydraulic system according to claim 1, wherein the screen assembly further includes a flange for attaching the filter screen to the plate member.

4. A hydraulic system according to claim 1, wherein the plate member is integrally connected to the gasket.

5. A hydraulic system according to claim 4, wherein the plate member forms at least one bonding hole, and the gasket essentially fills the at least one bonding hole to mechanically connect the plate member to the gasket.

6. A hydraulic system according to claim 4, wherein the plate member further includes a locating bump.

7. A hydraulic system according to claim 1, wherein the screen assembly further includes a basket assembly connected to the plate member, wherein the basket assembly is disposed to mechanically support the filter screen.

8. A hydraulic system according to claim 7, wherein the basket assembly includes at least one support arm and a support ring.

9. A hydraulic system according to claim 7, wherein the plate member and the basket assembly are a single part.

10. A hydraulic system according to claim 7, wherein the plate member, the basket assembly, and the filter screen are a single part.

11. A hydraulic system according to claim 1, wherein the filter screen has a surface area greater than the cross-section area of the aperture.

12. A hydraulic system according to claim 11, wherein the filter screen further comprises an open end and a closed end.

13. A hydraulic system according to claim 12, wherein the open end is disposed towards the fluid flow in the hydraulic system.

14. A hydraulic system according to claim 12, wherein the closed end is disposed towards the fluid flow in the hydraulic system.

15. A hydraulic system according to claim 11, wherein the filter screen has a cylindrical shape.

16. A hydraulic system having a priming reservoir for hydraulically-actuated fuel injectors in an internal combustion engine, the priming reservoir having a lower reservoir and an upper reservoir, the hydraulic system comprising:
    a lower portion forming the lower reservoir;
    an upper reservoir structure mounted on the lower portion at an interface, the upper reservoir structure forming the upper reservoir;
    a filter gasket including,
        a gasket disposed along the interface for sealing the upper and lower portions,
        a screen assembly positioned adjacent to the interface to separate the upper and lower reservoirs, the screen assembly operatively engaging the gasket.

17. A hydraulic system according to claim 16,
wherein the lower portion has a lower reservoir supply passage;
wherein the upper reservoir structure has an upper reservoir supply passage; and
wherein the lower reservoir supply passage is operatively connected to the upper reservoir supply passage when the upper reservoir structure is mounted on the lower portion.

18. A hydraulic system according to claim 16,
wherein the lower portion has a top edge forming a depression;
wherein the upper reservoir structure has a bottom edge;
wherein the top edge connects with the bottom edge when the upper reservoir structure is mounted on the lower portion; and
wherein the gasket is disposed in the depression.

19. A hydraulic system according to claim 16, wherein the screen assembly comprises:
    a plate member operatively engaging the gasket, the plate member forming an aperture with a cross-section area; and
    a filter screen connected to the plate member, the filter screen enclosing the cross-section area of the aperture.

20. A hydraulic system according to claim 19, further comprising a flange for attaching the filter screen to the plate member.

21. A hydraulic system according to claim 19, wherein the plate member forms at least one bonding hole, and the gasket essentially fills the at least one bonding hole to mechanically connect the plate member to the gasket.

22. A hydraulic system according to claim 19, wherein the screen assembly further includes a basket assembly connected to the plate member, and wherein the basket assembly mechanically supports the filter screen.

23. A hydraulic system according to claim 19, wherein the filter screen has a surface area greater than the cross-section area of the aperture.

24. An internal combustion engine having a hydraulic system, the internal combustion engine comprising:
    a front cover having a top edge with a depression, the front cover forming a lower reservoir;
    an upper reservoir structure having a bottom edge and forming an upper reservoir, wherein the upper reservoir structure is mounted on the lower portion to connect the bottom edge to the top edge, wherein the upper reservoir connects to the lower reservoir to form a priming reservoir;
    a gasket disposed in depression for sealing the front cover and the upper reservoir structure;
    a screen assembly adjacent to the top and bottom edges, the screen assembly including,
        a plate member disposed for separating the upper and lower portions, the plate member operatively engaging the gasket, the plate member forming an aperture with a cross-section area, and
        a filter screen connected to the plate member, the filter screen enclosing the cross-section area of the aperture.

25. An internal combustion engine system according to claim 24, wherein the plate member is integrally connected to the gasket.

26. An internal combustion engine system according to claim 25, wherein the plate member forms at least one bonding hole, and the gasket essentially fills the at least one bonding hole to mechanically connect the plate member to the gasket.

27. An internal combustion engine system according to claim 24, wherein the screen assembly further includes a basket assembly connected to the plate member, wherein the basket assembly is disposed to mechanically support the filter screen.

28. An internal combustion engine system according to claim 24, wherein the filter screen has a surface area greater than the cross-section area of the aperture.

* * * * *